US011048862B2

United States Patent
Bindal et al.

(10) Patent No.: US 11,048,862 B2
(45) Date of Patent: Jun. 29, 2021

(54) ENHANCED DESIGN COLLABORATION USING DESIGN-BASED FEEDBACK

(71) Applicant: ADOBE INC., San Jose, CA (US)

(72) Inventors: Aditya Bindal, Delhi (IN); Anurag Gupta, Ghaziabad (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/504,118

(22) Filed: Jul. 5, 2019

(65) Prior Publication Data

US 2021/0004434 A1 Jan. 7, 2021

(51) Int. Cl.
*G06F 40/166* (2020.01)
*H04L 29/06* (2006.01)
*G06F 3/0481* (2013.01)
*G06F 3/0484* (2013.01)
*G06F 40/106* (2020.01)

(52) U.S. Cl.
CPC ........ *G06F 40/166* (2020.01); *G06F 3/04817* (2013.01); *G06F 3/04845* (2013.01); *G06F 40/106* (2020.01); *H04L 65/601* (2013.01)

(58) Field of Classification Search
CPC .. G06F 40/166; G06F 40/106; G06F 3/04817; G06F 3/04845; H04L 65/601
See application file for complete search history.

(56) References Cited

U.S. PATENT DOCUMENTS

| | | | |
|---|---|---|---|
| 2013/0155071 A1* | 6/2013 | Chan | G06T 13/00 345/473 |
| 2014/0019854 A1* | 1/2014 | Alexander | G06Q 10/10 715/266 |
| 2014/0075335 A1 | 3/2014 | Hicks et al. | |
| 2016/0196247 A1 | 7/2016 | Lee et al. | |

FOREIGN PATENT DOCUMENTS

| | | |
|---|---|---|
| EP | 3 185 104 A1 | 6/2017 |
| WO | 2013070818 A1 | 5/2013 |

OTHER PUBLICATIONS

Combined Search and Examination Report under Sections 17 and 18(3) in British Patent Application No. GB2006538.9. 11 pages.

* cited by examiner

*Primary Examiner* — Roland J Casillas
(74) *Attorney, Agent, or Firm* — Shook, Hardy & Bacon, L.L.P.

(57) ABSTRACT

Methods and systems are provided for enhancing design collaboration using design-based feedback. In embodiments, an indication to provide feedback in accordance with a graphical design element within a document is received. Text-based feedback related to the graphical design element within the document is obtained, and design-based feedback that manipulates the graphical design element within the document is obtained. Thereafter, a feedback indicator is generated that indicates the text-based feedback and the design-based feedback related to the graphical design element. The feedback indicator is provided (e.g., to a server) for presentation (e.g., via a user device) to one or more collaborators of the document such that the document with the text-based feedback and the design-based feedback is viewable to the one or more collaborators.

20 Claims, 11 Drawing Sheets

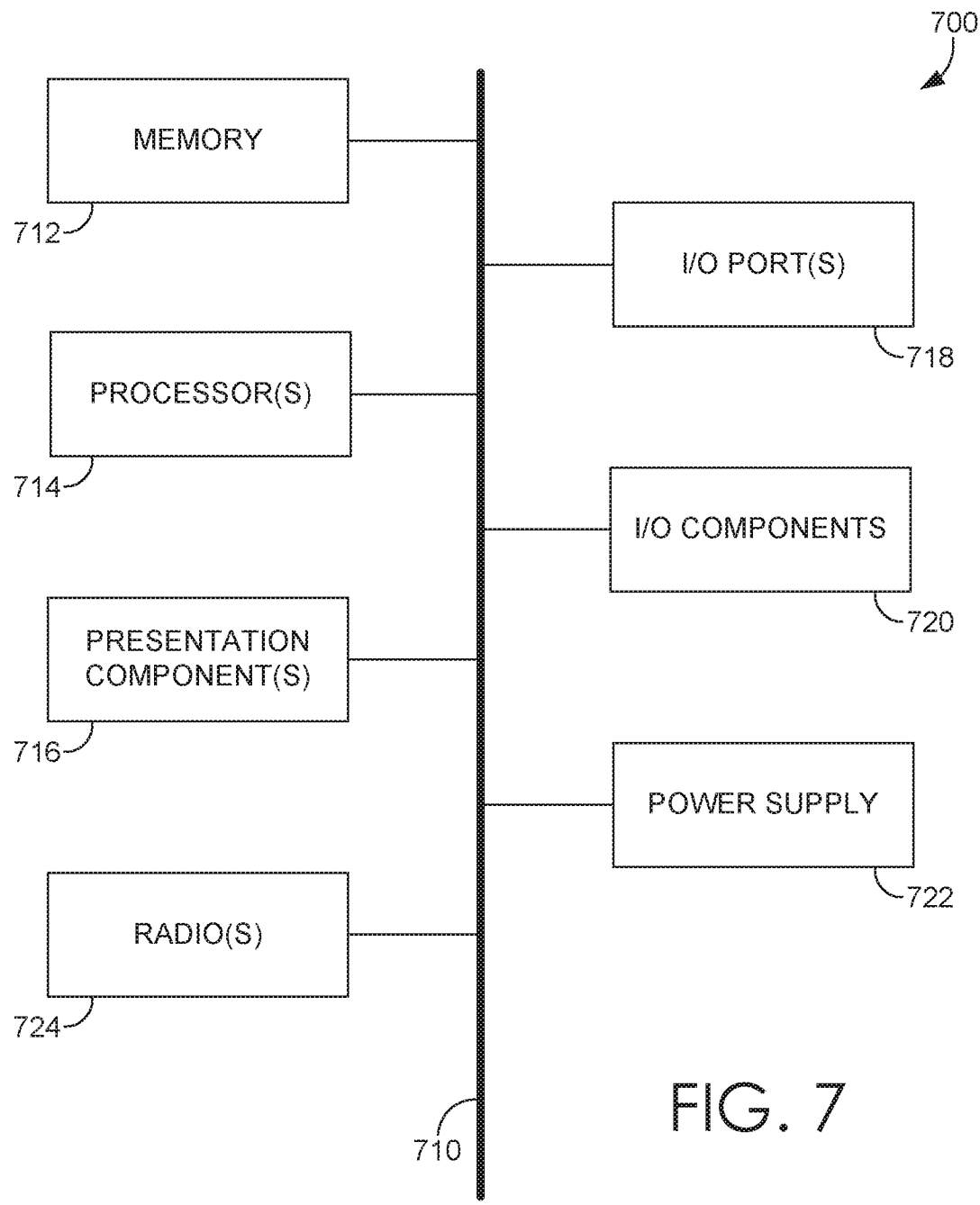

ENHANCED DESIGN COLLABORATION USING DESIGN-BASED FEEDBACK

BACKGROUND

Oftentimes, users desire to collaborate on creating documents. For example, input from several collaborators may be desired to generate a document. Generally, to provide feedback, collaborators often provide text comments in association with the document. In this regard, a user may select a portion of the document and insert a text comment to express a comment, suggestion, or thought.

In some cases, a portion of the document for which a comment is provided relates to a visual aspect of the document. In such cases, a user may attempt to provide feedback via a text comment. For instance, a collaborator may suggest to move an image to the left or reduce the size of the image. It can be difficult to articulate and/or provide feedback relating to visual features of a document via text. It can also be difficult for another collaborator to interpret such feedback. Continuing with the above example, it may be difficult to articulate and/or difficult to interpret how far a collaborator desires to move an image in a given direction or by how much the collaborator desired to change the size of the image. As such, multiple rounds of revisions may occur in an effort to modify visual aspects of a document using text-based feedback, thereby resulting in unnecessary time spent on revising a document.

SUMMARY

Embodiments of the present disclosure are directed to facilitating enhanced design collaboration using design-based feedback. Design-based feedback generally refers to non-text feedback provided in relation to a design of a document. In this regard, design-based feedback may include any of a number of manipulations applied to a graphical design element. For example, design-based feedback may include modifications to a position, size, format, style, etc. associated with a graphical design element within a document. Upon obtaining design-based feedback, the design-based feedback, and in some cases associated text-based feedback, can be provided to other document collaborators such that the provided feedback can be previewed in a visual manner. Advantageously, previewing design-based feedback enables other collaborators to more precisely understand the perspective of the collaborator providing the design-based feedback. As such, visual or aesthetics modifications can be more readily assessed and/or adopted resulting in decreased iterations and time needed to generate a final document.

BRIEF DESCRIPTION OF THE DRAWINGS

FIG. 7 is a block diagram of an example computing device in which embodiments of the present disclosure may be employed.

DETAILED DESCRIPTION

Figure 1:
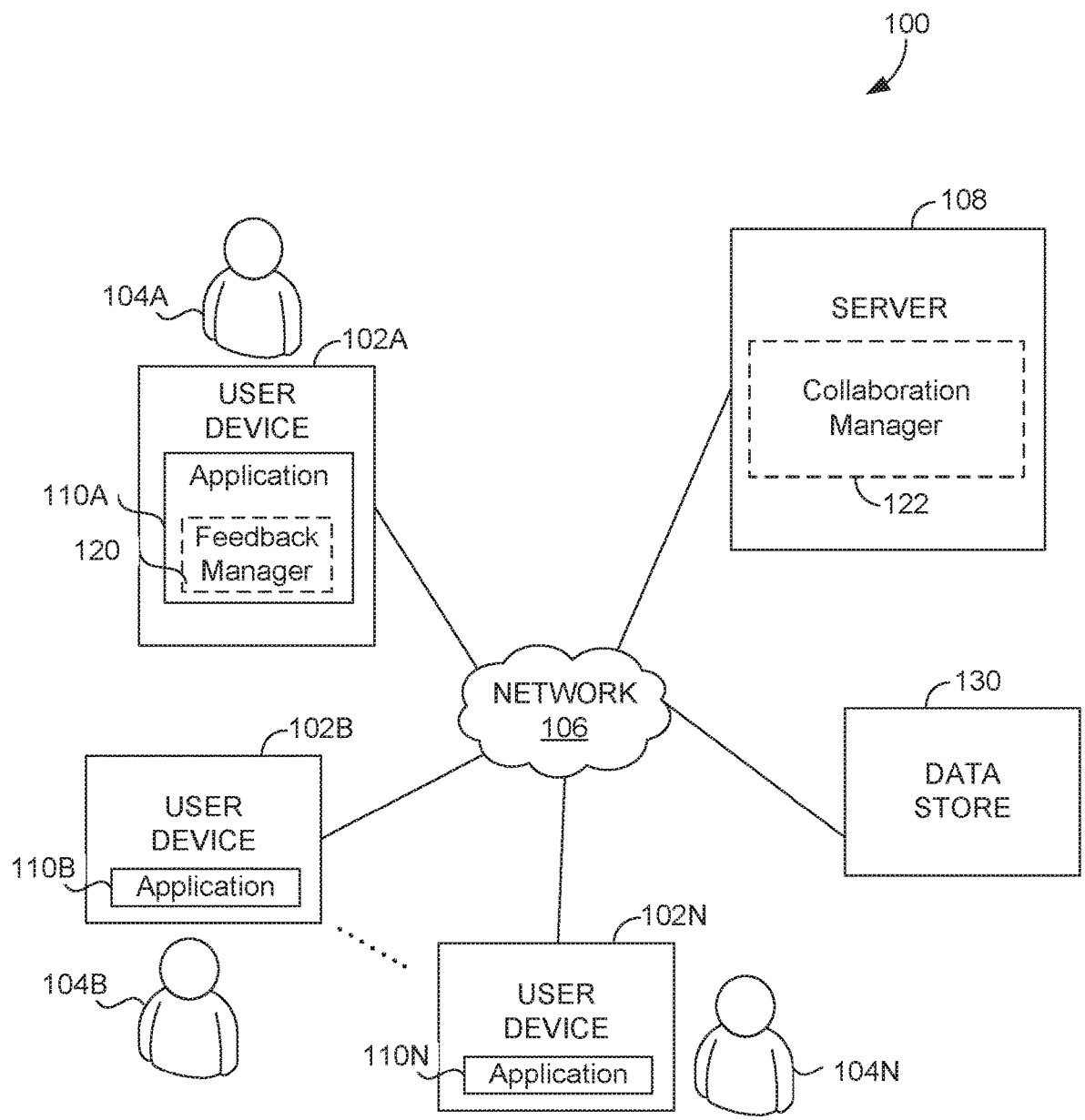
FIG. 1 depicts an example configuration of an operating environment in which some implementations of the present disclosure can be employed, in accordance with various embodiments of the present disclosure.

Individuals oftentimes collaborate to generate a final document. In particular, an initial document may be created and multiple individuals, or entities, may contribute input to arrive at a final work product. Such contributed input is generally provided as text, for example, in the form of a comment added to a document. By way of example only, assume a campaign specialist creates a new poster and solicits input from various entities, some of which may be commenting on content of the poster and some of which may be commenting on aesthetics of the poster. In such a case, the various entities provide comments in the form of text indicating recommendations, preferences, or the like. For instance, one comment may state a desire to "move the image to the right."

Feedback pertaining to the design or aesthetics associated with a document, however, can be difficult to convey via text. Although a reviewer or collaborator of a document may be able to generally express comments in text pertaining to document design, it is oftentimes difficult to effectively convey such details. For instance, in some cases, a visual perspective of a reviewer is difficult to specify in text. In other cases, reviewer-provided text describing a visual appearance of a document may be difficult to interpret by another participant.

The inability to specify and/or interpret text comments related to visual aspects of a document can result in numerous editing iterations, thereby increasing time and effort to obtain a desired or finalized document. For example, assume a reviewer provides a text comment that specifies "the text spacing is too crowded." Based on the provided comment, in a first editing iteration, a document creator may modify the font style or type to increase spacing between characters in the text. In accordance with the modified document, the reviewer may clarify via another text comment the intent to increase the spacing of the words. In a second editing iteration, the document creator may revert to the original font and increase the spacing between words in the text. Upon review, the reviewer may provide another textual clarification of the intent to increase the spacing between the words and an image. As a result, a third editing iteration may be applied to increase spacing between the words and the image. In this way, multiple editing iterations may occur in an effort to accurately interpret the text comments provided by a reviewer.

As such, embodiments of the present disclosure are directed to facilitating enhanced design collaboration using design-based feedback. Design-based feedback generally refers to non-text feedback provided in relation to a design of a document. In this regard, design-based feedback may include any of a number of manipulations applied to a graphical design element. For example, design-based feedback may include modifications to a position, size, format, style, etc. associated with a graphical design element within a document. Upon obtaining design-based feedback, the design-based feedback, and in some cases associated text-based feedback, can be provided to other document collaborators such that the provided feedback can be previewed in a visual manner. Advantageously, previewing design-based feedback enables other collaborators to more precisely understand the perspective of the collaborator providing the design-based feedback. As such, visual or aesthetics modifications can be more readily assessed and/or adopted resulting in decreased iterations and time needed to generate a final document.

In operation, and at a high level, in accordance with reviewing a document, a user may select to provide feedback regarding a design of a document, or portion thereof. For instance, a user may desire to modify a particular graphical design element (e.g., image, text, icon, table, etc.) within the document and, as such, select a feedback element via a graphical user interface to initiate feedback provision. The user may provide text-based feedback and/or design-based feedback associated with a desired portion or graphical design element within a document. By way of example, a user may provide text via a comment box as well as a design modification via various design editing tools (e.g., to modify position, scale, size, font, type, style, etc. associated with a particular graphical design element). In this way, visual context of the design can correspond with text-based feedback provided in a comment box thereby increasing visibility as to desired design modifications and improving collaboration workflow.

Upon inputting feedback, the feedback can be provided to other users, or document collaborators, such that the feedback can be viewed and incorporated into the document as desired. In some cases, the feedback may be automatically presented to collaborators (e.g., in accordance with viewing a document). In other cases, the feedback may be presented based on user selection. For example, a user may select to view or preview feedback input by a collaborator or set of collaborators. In yet other cases, text-based feedback may be automatically presented (e.g., in accordance with viewing a document) and design-based feedback may be previewed based on a user selection.

Figure 3A:
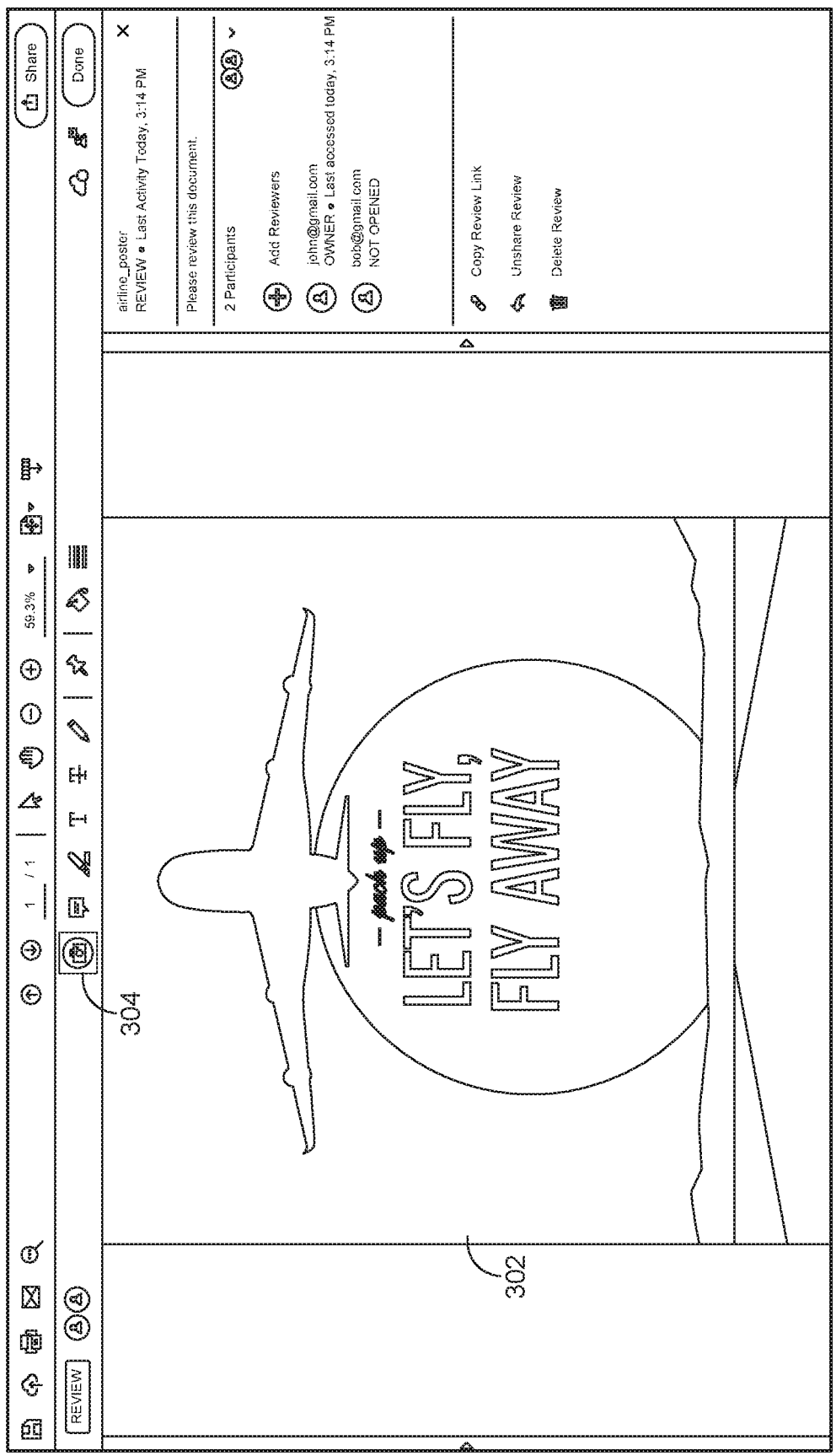
FIGS. 3A-3E provide example graphical user interfaces in accordance with embodiments described herein.
Figure 3B:
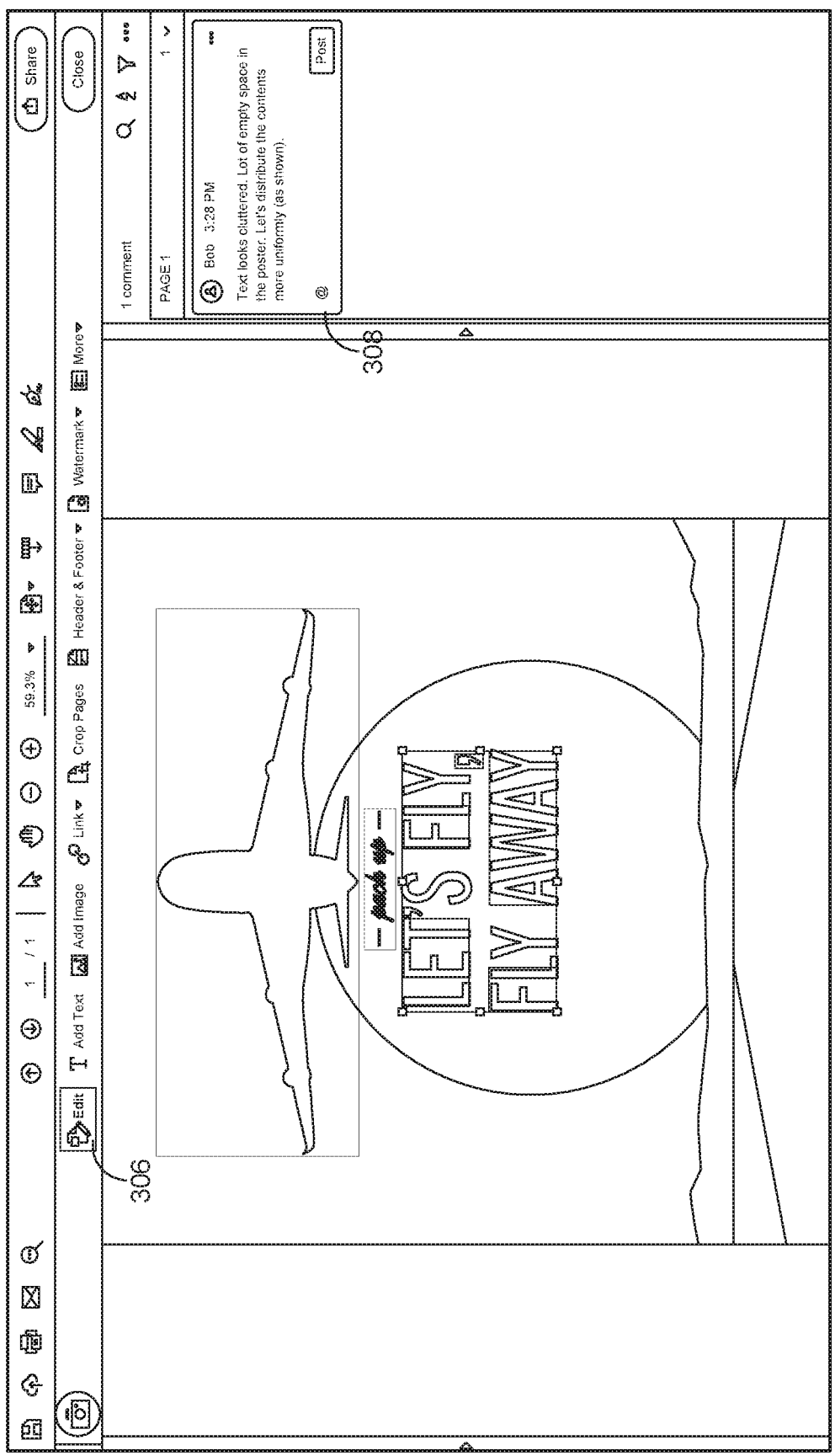
Figure 3C:
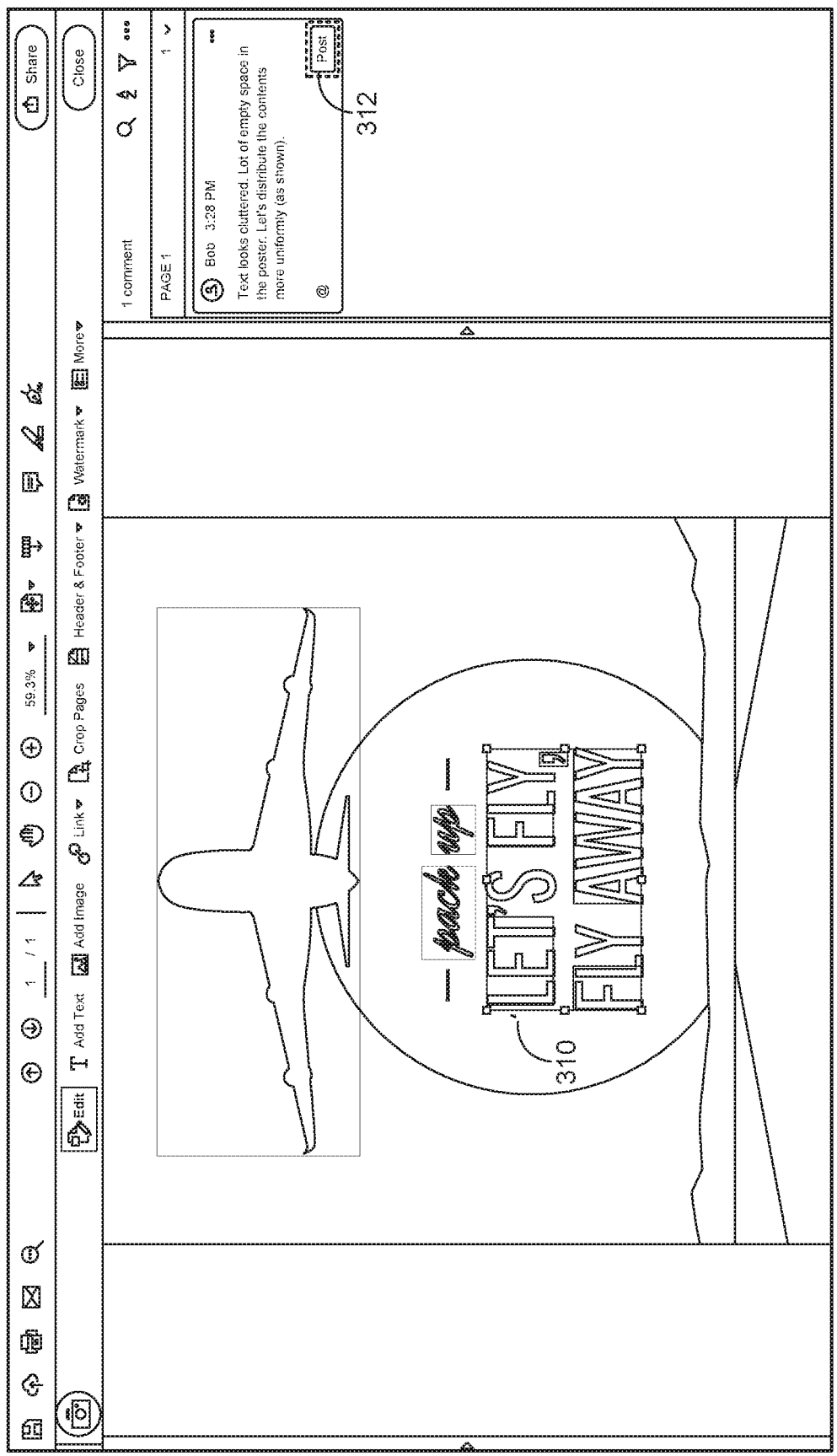

By way of example only, and with brief reference to FIG. 3C, in addition to providing a text-based comment via comment box, the feedback provider can also modify the document content to provide design-based feedback. In this particular example, the feedback provider modifies design graphical element 310 by moving the design graphical elements downward on the document to distribute the contents. When the feedback provider modifies the graphical design element 310 as desired, the feedback provider can click on the "post" button 312. In accordance with some embodiments, selection of such a "post" button can initiate capturing of the comment and/or content-diff of the changes and send such feedback to a server for provision to other collaborators of the document.

Turning now to FIG. 1, FIG. 1 depicts an example configuration of an operating environment in which some implementations of the present disclosure can be employed, in accordance with various embodiments of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 7.

It should be understood that operating environment 100 shown in FIG. 1 is an example of one suitable operating environment. Among other components not shown, operating environment 100 includes a number of user or collaborator devices 102A and 102B through 102N (which may be referred to herein as user devices 102 or collaborator devices), network 106, and server(s) 108. Each of the components shown in FIG. 1 may be implemented via any type of computing device, such as one or more of computing device 700 described in connection to FIG. 7, for example. These components may communicate with each other via network 106, which may be wired, wireless, or both. Network 106 can include multiple networks, or a network of networks, but is shown in simple form so as not to obscure aspects of the present disclosure. By way of example, network 106 can include one or more wide area networks (WANs), one or more local area networks (LANs), one or more public networks such as the Internet, and/or one or more private networks. Where network 106 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 106 is not described in significant detail.

It should be understood that any number of user devices, servers, and other components may be employed within operating environment 100 within the scope of the present disclosure. Each may comprise a single device or multiple devices cooperating in a distributed environment.

User devices 102 (also referred to herein as collaborator devices) can be any type of computing devices capable of being operated by a user or collaborator. For example, in some implementations, a user device 102 is the type of computing device described in relation to FIG. 7. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 (application 110A and 110B through 110N) shown in FIG. 1. Application 110 is referred to as a single application for simplicity, but its functionality can be embodied by one or more applications in practice. As can be appreciated, applications 110A and 110B through 110N can be a same type of application, though not necessarily the same version or even the same application, operating on the various user devices. For example, each application 110 may be an application that provides document design functionality (e.g., Adobe® XD). Generally, applications 110A and 110B through 110N enable users to collaborate on creating and editing documents. Although generally described as performing document collaboration via a server, as can be appreciated, other embodiments may not employ a server to carry out document collaboration function (e.g., via a peer-to-peer network). In such cases, the functionality described herein in association with the server may be performed at other devices, such as user devices 102.

As more fully described below, the user devices 102 may be operated by various users or collaborators of a document collaboration application. To convey aspects of the present technology, various users or collaborators may be described as a document creator and a feedback provider. A document creator generally refers to a user that creates a document (an initial document). A feedback provider generally refers to a user that provides feedback pertaining to a document. As shown in FIG. 1, for illustrative purposes, the user device 102A is operated by a feedback provider 104A, and user device 102B is operated by a document creator 104B. Although illustrated in this manner, any one of the user devices 102 is generally operated by a user or collaborator, any of which may create a document, provide feedback, and/or view the document and feedback.

The applications 110 operating on user devices 102 may generally be any application capable of facilitating the exchange of information between the user devices and, in some embodiments, the server 108 in carrying out enhanced design collaboration. In some implementations, the application(s) comprises a web application, which can run in a web browser, and could be hosted at least partially on the server-side of environment 100. In addition, or instead, the application(s) can comprise a dedicated application, such as an application having document design functionality. In some cases, the application is integrated into the operating system (e.g., as a service). It is therefore contemplated herein that "application" be interpreted broadly.

In accordance with embodiments herein, the application can facilitate enhanced design collaboration using design-based feedback and previews thereof. Enhanced design collaboration generally enables collaboration, related to a design of a document, provided in a non-text form. To this end, graphical design elements within a design document can be manipulated and provided as visual feedback. Based on the design-based feedback, a preview of such feedback can be presented to other collaborators such that other collaborators can visually view design intentions of the reviewer providing the feedback.

To provide feedback pertaining to a document, the application, such as application 110A on user device 102A, can access a design document. As described herein, a design document may refer to any type of electronic document on which a graphical design may be or is created. As one example, a document created via Adobe® XD may be one type of design document on which a creator, such as document creator 104B operating user device 102B, may create a graphical design using one or more graphical elements. Graphical elements may include images, icons, tables, charts, text, or other graphical elements. In some embodiments, graphical elements on a design document include at least one non-text graphical element, such as, for example, an image, an icon, a table, a chart, a diagram, etc.

The design document being accessed may be created, for example, by another collaborator or user. For example, as described, a document creator, such as document creator 104B operating user device 102B, can create a design document via the application 110B. To create a graphical design within a document, a document creator may use any graphical design techniques and functionality. For instance, a user may input text into a document, select an image for the document, position or place a graphical element with the document, size a graphical element, or the like. Graphical design techniques used to create a document are not intended to be limited herein.

Upon a user or document creator 104B creating a graphical design within a design document, the design document may be shared, via user device 102B, with other users or collaborators, such as users 104A and 104N. For example, in some cases, a document share button may be selected, via a graphical user interface, to initiate sharing of the design document with other document collaborators. For instance, document creator 104B may select a document share button. In accordance with selecting the document share button, the design document, and/or document data (data associated with a design document), can be provided to a server (e.g., server 108) for sharing with other collaborators such that other user devices can access the design document.

The design document may be stored, for example in data store 130, and accessible to server(s) 108 and various user devices of a document collaboration environment. A user device may access a design document in any number of ways. For example, a link can be generated and provided (e.g., via email) to user devices, such as user devices 102B and 102N, for collaborators or reviewers to access the design document. In other examples, a user may open application 110 and be provided with access to a design document (e.g., automatically provided or upon user selection).

Upon accessing a design document, application 110 executing on a user device can present the design document to enable enhanced design collaboration. In this way, users, such as feedback providers (or reviewers), can view the design document and provide feedback related to the design document.

As illustrated, application 110, such as application 110A on user device 102A, can include feedback manager 120 to enable users to provide feedback pertaining to a design document thereby enhancing design collaboration. As can be appreciated, each user device 102 may include a feedback manager 120. As described throughout this disclosure, feedback manager 120 enables a user to provide design-based feedback and/or text-based feedback. To facilitate enhanced design collaboration, upon creating a design document, such as a design document created by document creator 104B of user device 102B, the design document can be accessed by a feedback provider 104A via user device 102A and manipulated to provide feedback related to the design of the document. In some cases, enhanced design collaboration may be automatically implemented in association with the application 110 (e.g., as a default setting). In other cases, a user may select to initiate enhanced design collaboration. In this regard, a user may select to enable design-based feedback.

Feedback manager 120 generally manages feedback, such as design-based feedback and/or text-based feedback pertaining to a design document. Generally, feedback, or design document feedback, refers to feedback made to or provided for a design document. Design document feedback may include text-based feedback and design-based feedback. Text-based feedback refers to feedback, or comments, provided in text (e.g., by a feedback provider or reviewer). As such, a feedback provider may provide text comments associated with various aspects of the design document. For example, a feedback provider may provide text-based feedback pertaining to the text content in the document, the design layout of the document, an image within the document, etc.

Design-based feedback generally refers to non-text feedback made to a graphical design element within the design document. Stated differently, design-based feedback refers to a modification of the design (e.g., layout) of a graphical design element(s) within the design document. Design-based feedback may include, for example, modification of size, position, placement, type, etc. of a graphical design element within a design document.

In this regard, a user may interact with application 110, via a graphical user interface, to modify or manipulate a graphical design element within a design document. Design-based feedback may be made using any of a variety of graphical design tools and functionality, for example, provided in association with application 110. By way of example only, a user, such as feedback provider 104A of user device 102A, may utilize design editing tools to modify position, size, scale, shape, style, format, etc. associated with a graphical design element.

In some implementations, to provide design document feedback, a feedback provider, or reviewer, may select to provide design document feedback via selection of a feedback element presented via a graphical user interface. A feedback element generally refers to a tool or component presented via a graphical user interface that enables a user to provide design document feedback (e.g., deign-based feedback and/or text-based feedback). A feedback element may be visually represented via a graphical user interface in any number of ways, such as, for example, an icon or button. By selecting a feedback element, text-based comments and/or design modifications can be provided by a reviewer.

Feedback may be provided by a user in any number of ways. In some embodiments, a user may select a graphical display element of the document for which to provide feedback. For example, a user may highlight or select a particular graphical display element corresponding to feedback to be provided. In accordance with selecting a graphical display element, a user may provide text-based feedback and/or design-based feedback. In some cases, a comment box may be presented for obtaining text-based feedback. For example, upon selecting a particular graphical display element, a comment box may be presented. A user may then provide text-based feedback in the comment box. To provide design-based feedback, a user may manipulate the selected graphical display element in any number of ways. For example, a user may utilize one or more design editing tools to modify a position, scale, size, color, format, style, or the like, associated with a graphical display element. Although various embodiments describe inputting both text-based feedback and design-based feedback in association with a graphical display element, as can be appreciated, both types of feedback are not necessary.

In operation, and in accordance with feedback input by a user (e.g., text-based feedback and design-based feedback), feedback manager 120 can obtain, detect, or identify feedback and generate a feedback indicator. A feedback indicator refers to an indication of feedback provided by a user. As such, a feedback indicator may indicate text-based feedback and/or design-based feedback. A feedback indicator may be or include metadata. Such metadata may be embedded in a document file or be separate from the document file. To generate a feedback indicator, the application 110, or portion thereof (e.g., feedback manager 120) may identify a graphical design element(s) for which feedback is provided, a text-based feedback, a design-based feedback, a feedback provider, and/or the like. To identify design-based feedback, the application, or feedback manager 120 may identify a difference in the document, or portion thereof (e.g., graphical design element), based on the provided design-based feedback. For instance, the feedback manager 120, or application 110, may compare differences (e.g., graphical or visual differences) between two files or documents (e.g., a modified version and a previous or original version) and create a "content diff" or comparison for use in indicating differences in the document (e.g., design-based differences). Below is one example of a feedback indicator:

{"id":21323, "creator":{"email": "bpb@xyz.com", "name": "BOB" }, "captiontext": "Move the plane to the UP", "content_diff": "<binary diff>", "boundingbox": [276.028961,621.649414,356.142303, 647.793884] }.

In this example, the "captiontext" component of the feedback indicator indicates text-based feedback, and the "content diff" component of the feedback indicator indicates design-based feedback. The content_diff can be represented in any number of ways, one of which is via use of binary data. Further, as shown in this example, the "boundingbox" component of the feedback indicator indicates the graphical design element, or portion of the document, associated with the text-based feedback and the design-based feedback. This example provides the coordinates of the bounding box associated with the feedback, but a graphical design element for which feedback is provided can be indicated or designated in any number of other ways. Although the example feedback indicator provides an indication of both the text-based feedback and the design-based feedback, as can be appreciated, such information can be provided via separate indicators. For example, a text feedback indicator may provide an indication of text-based feedback, while a separate design feedback indicator may provide an indication of design-based feedback. Further, as described herein, in some cases, only text-based feedback or design-based feedback is provided. In such cases, only such information may be conveyed in a feedback indicator.

In some cases, a feedback indicator may be generated and/or provided upon a user inputting feedback, such as text-based feedback and/or design-based feedback. In other cases, a feedback indicator may be generated and/or provided upon a user selecting to publish input feedback such that other users can view the feedback. For example, via the application 110, or another application operating on user device 102A, a feedback provider can select to publish the input feedback for which publication or accessibility to other collaborators is desired. As one example, a user may select a "publish" button or icon to initiate publication or accessibility of the input feedback to other collaborators of the design document. In this way, the feedback contributed by a collaborator may be captured and made accessible to other collaborators to enable the other collaborators to view the provided feedback. By way of example only, upon inputting text-based feedback and design-based feedback in association with a particular graphical design element(s), the user may select to "publish" the feedback. As such, a feedback indicator containing indications of the text-based feedback and design-based feedback can be provided to the server 108 for publication or accessibility of the feedback to other collaborators of the design document.

With continued reference to FIG. 1, as described herein, server 108 can facilitate enhanced collaboration using design-based feedback via collaboration manager 122. Server 108 includes one or more processors, and one or more computer-readable media. The computer-readable media includes computer-readable instructions executable by the one or more processors. The instructions may optionally implement one or more components of collaboration manager 122, described in additional detail below. As can be appreciated, aspects of the collaboration manager 122 may be performed via the feedback manager 120, and vice versa. For example, in a peer-to-peer environment, the feedback managers 120 on the user device(s) may perform functions described herein in association with the collaboration manager 122.

At a high-level, collaboration manager 122 can generally manage user collaboration related to a design document. In particular, in accordance with embodiments described herein, the collaboration manager 122 can facilitate the sharing of design document feedback provided by a feedback provider or reviewer.

Data store 130, accessible to collaboration manager 122, can store computer instructions (e.g., software program instructions, routines, or services) and data used in embodiments described herein. In some implementations, data store 130 stores information or data received via the user devices 102 and provides the user devices 102 with access to that information or data, as needed. Although depicted as a single component, data store 130 may be embodied as one or more data stores. Further, the information in data store 130 may be distributed in any suitable manner across one or more data stores for storage (which may be hosted externally). In embodiments, data stored in data store 130 includes documents, feedback indicators, data associated therewith, and/or the like.

The collaboration manager 122 can receive a feedback indicator(s) via a user device. For example, as described, upon a user providing feedback, a feedback indicator indicating the feedback can be generated and provided to the server. Feedback indicators can be stored, for example via data store 130, in association with the corresponding design document.

In embodiments, to facilitate feedback sharing, the collaboration manager 122 can enable other users or collaborators (including the user providing the feedback) to view the feedback. In some cases, the collaboration manager 122 may provide a notification of new feedback. For example, the collaboration manager 122 may communicate an email indicating that new feedback has been received for a particular design document. As another example, the collaboration manager 122 may provide a notification to application 110 such that when a design document is accessed via application 110 on a user device, a notification appears within the design document indicating new feedback associated with the design document. As can be appreciated, a notification may include any type of information, such as an identifier (e.g., user name) of the feedback provider, an identifier of the graphical design element(s) for which feedback was provided, an indication of a time at which feedback was provided, or the like.

The collaboration manager 122 can provide the design document with corresponding feedback to various user devices. In this regard, a user device 102 via an application 110 may access and/or open a design document and corresponding feedback provided by one or more feedback providers. As such, application 110 operating on a user device 102 can facilitate viewing of the design document and corresponding feedback.

The design document and the feedback can be provided to the collaboration manager in any number of ways. As one example, a feedback indicator can be provided along with the document to the user device such that the user device application can read or implement the feedback (e.g., via design modifications) into the document. As another example, the server 108, or portion thereof, can read the feedback indicator and create the document with the feedback incorporated (e.g., via design modifications) and then send the modified document having the incorporated feedback to the user device(s). As yet another example, the document may be communicated to a user device(s) with calls back to the server 108 for accessing feedback information. For instance, for a particular feedback (e.g., design-based feedback), a call may be made to the server to obtain the design-based feedback. In some cases, a separate server call may be triggered for each feedback (e.g., design-based feedback) to obtain a corresponding feedback indicator, or portion thereof (e.g., content-diff).

Design document feedback, such as design-based feedback and text-based feedback, can be presented via application 110 of a user device in any number of ways. In one implementation, design document feedback may be automatically presented via a graphical user interface. In such an implementation, upon opening or viewing a design document, or as feedback is obtained, design document feedback, such as design-based feedback and text-based feedback, may be automatically presented in association with presentation of the design document (e.g., incorporated into the document, concurrently displayed in a margin of the document or the application view, or the like).

In another implementation, design document feedback may be presented based on a user selection to view design document feedback provided by any feedback provider or a select set of feedback providers. In such an implementation, upon opening or viewing a design document, or as feedback is obtained, a user may select an icon to view or preview the feedback. In response to such a user selection, the feedback may be presented (e.g., in a comment box and/or visually within the document to illustrate the design modifications). As can be appreciated, a user may select to view all feedback, feedback from a particular user or set of users, feedback associated with a particular graphical display element or set of graphical display elements, or the like.

In yet another implementation, one feedback type may be automatically presented while another feedback type may be presented upon a user selection. For instance, text-based comments may be automatically presented via a graphical user interface, while design-based feedback is provided based on user selection to view the design-based feedback. By way of example, as a design document is presented, a comment text may be automatically presented along with a design feedback preview button. Selection of a design feedback preview button enables a user to select to view design modifications made by a reviewer. In some cases, upon selecting a preview button, the design modifications, for example, as indicated by a "content_diff" component within a feedback indicator, can be applied to a copy (e.g., local copy) of the design document file such that the user can view the design modifications made by a feedback provider.

In some cases, a design feedback preview button may be a global button that, upon selection, provides all design modifications provided by a user or a set of users. In other cases, a design feedback preview button may be a local button presented in association with a particular graphical design element or text-based on comment. In this regard, when a user selects a local button associated with a particular graphical design element or text-based comment, the user can preview a design modification related to the particular graphical design element or text-based comment.

In some cases, as the presented design-based feedback can be presented in a preview mode, a user, such as document creator 104B, can elect whether to include the design modifications provided via the design-based feedback in an updated version of the design document. In cases that the design-based feedback is desired, an updated version of the design document may be created and stored, for example at data store 130.

For cloud-based implementations, the instructions on server 108 may implement one or more components of collaboration manager 122, and application 110 may be utilized by a user to interface with the functionality implemented on server(s) 108. In some cases, application 110 comprises a web browser. In other cases, server 108 may not be required. For example, the components of collaboration manager 122 may be implemented completely on a user device or set of user devices, such as user devices 102. In this case, collaboration manager 122 may be embodied at least partially by the instructions corresponding to application 110.

It should be appreciated that collaboration manager 122 may be provided via multiple devices arranged in a distributed environment that collectively provide the functionality described herein. Additionally, other components not shown may also be included within the distributed environment. In addition, or instead, collaboration manager 122 can be integrated, at least partially, into a user device, such as user device 102. Furthermore, collaboration manager 122 may at least partially be embodied as a cloud computing service.

Figure 2:
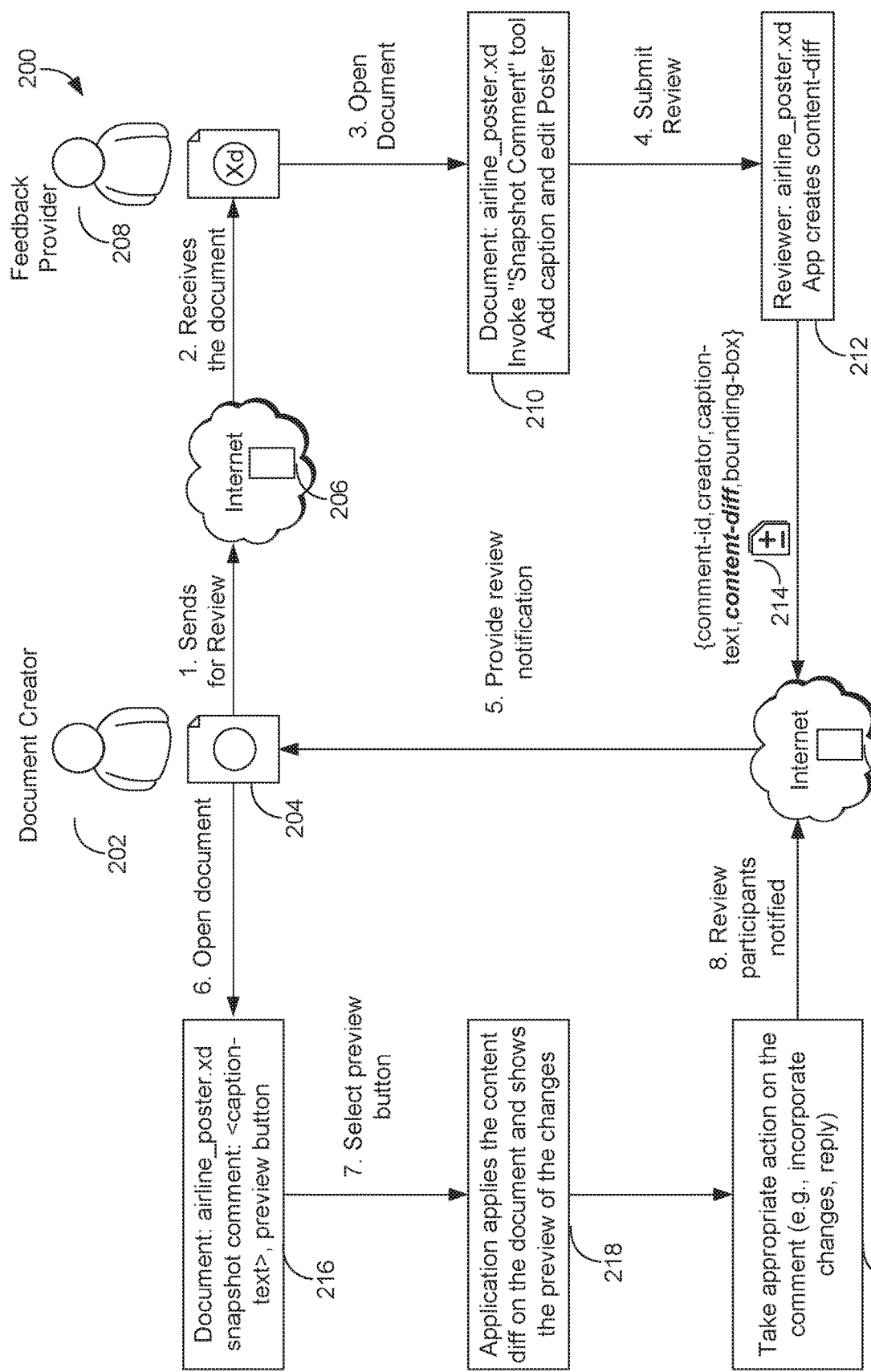
FIG. 2 depicts an exemplary flow diagram for facilitating enhanced design collaboration using design-based feedback, in accordance with various embodiments of the present disclosure.

FIG. 2 provides an exemplary flow diagram 200 for facilitating enhanced design collaboration using design-based feedback. In flow diagram 200, a document creator 202 initially creates a design document 204. Such a design document can include any number of graphical design elements. When the document creator 202 has prepared the design document 204 to his or her liking, the design document can be shared with other collaborators of the design document. In this regard, the design document 204 can be provided to a server 206, and a feedback provider 208 can access and view the design document 204. Assume the feedback provider 208 views the design document 204 and desires to provide feedback regarding the design of a graphical design element(s) within the document. In such a case, assume feedback provider 208 provides feedback in the form of text and design modifications or manipulations. In this regard, the feedback provider 208 may select a feedback element via the graphical user interface and input both text-based feedback and design-based feedback. This is illustrated at block 210.

Upon completing the feedback, the feedback provider 208 can indicate a completion of the feedback (e.g., via a "publish" button). Thereafter, as shown at block 212, the application can identify graphical design element manipulations or modifications and create a feedback indicator including a content_diff that indicates differences in graphical design element (e.g., from an original version and edited version). The feedback indicator 214 can be communicated to the server 206 (e.g., via a network). Server 206 can generate a notification indicating new feedback, which can be communicated to document creator 202 (among other collaborators). Document creator 202 can then access the design document, which has access to the new feedback. In some cases, the design document may be opened. In other cases, the design document may already be opened with the new feedback accessible or viewable. In this example, assume document creator 202 opens the reviewed document. In such a case, at block 216, the reviewed document is opened and presented with the text-based feedback displayed and a preview button displayed. Upon selection of the preview button, at block 218, the application can apply the content_diff on the document and present the preview of the design-based feedback provided by the feedback provider 208. Thereafter, as indicated at block 220, the document creator 202 can view the feedback and apply an appropriate action based on the feedback viewed. For example, a document creator 202 may agree with the design-based feedback and select to incorporate or implement such changes. As another example, a document creator 202 may view the feedback and have additional feedback to provide. For instance, the document creator 202 may add a text-based comment to agree or disagree with the feedback provided by the feedback provider. Additionally or alternatively, the document creator 202 may provide design-based modifications that modify the original design of the document or the document having the design-based feedback applied thereto. For instance, the document creator 202 may adjust the design feedback provided by the feedback provider. Such design-based feedback can then be provided to other collaborators for their review. Any such feedback or modifications made to the design document can be provided to the server 206 for providing to other collaborators of the design document.

Turning to FIGS. 3A-3E, FIGS. 3A-3E provide exemplary graphical user interfaces for use in implementing embodiments described herein. These are illustrative graphical user interfaces and not intended to limit the scope of embodiments described herein. With initial reference to FIG. 3A, assume a document creator creates a document 302 and sends the document 302 to a feedback provider for review. Feedback provider can open the document 302 such that the document 302 is presented via the graphical user interface. In some cases, the feedback provider may receive an email notification regarding the document and, thereafter, open the document 302. Assume further that upon reviewing the document 302, the feedback provider would like to provide feedback pertaining to the document 302. As such, as illustrated in FIG. 3A, the feedback provider can select the feedback tool 304 to initiate providing feedback. Upon selecting the feedback tool 304, the document 302 can open in edit mode 306, as illustrated in FIG. 3B. Further, as shown in FIG. 3B, a comment box 308 is presented (e.g., in the margin associated with the application). The feedback provider can provide text-based feedback via the comment box 308. In this example, the feedback provider provides the following comment in the comment box 308: "Text looks cluttered. Lot of empty space in the poster. Let's distribute the contents more uniformly (as shown)."

In addition to providing a text-based comment via comment box 308, the feedback provider also modifies the document content to provide design-based feedback, as shown in FIG. 3C. In this particular example, the feedback provider modifies design graphical element 310 by moving the design graphical elements downward on the document to distribute the contents. When the feedback provider modifies the graphical design element 310 as desired, the feedback provider can click on the "post" button 312. In accordance with some embodiments, selection of such a "post" button can initiate capturing of the comment and/or content-diff of the changes and send such feedback to a server for provision to other collaborators of the document.

Figure 3D:
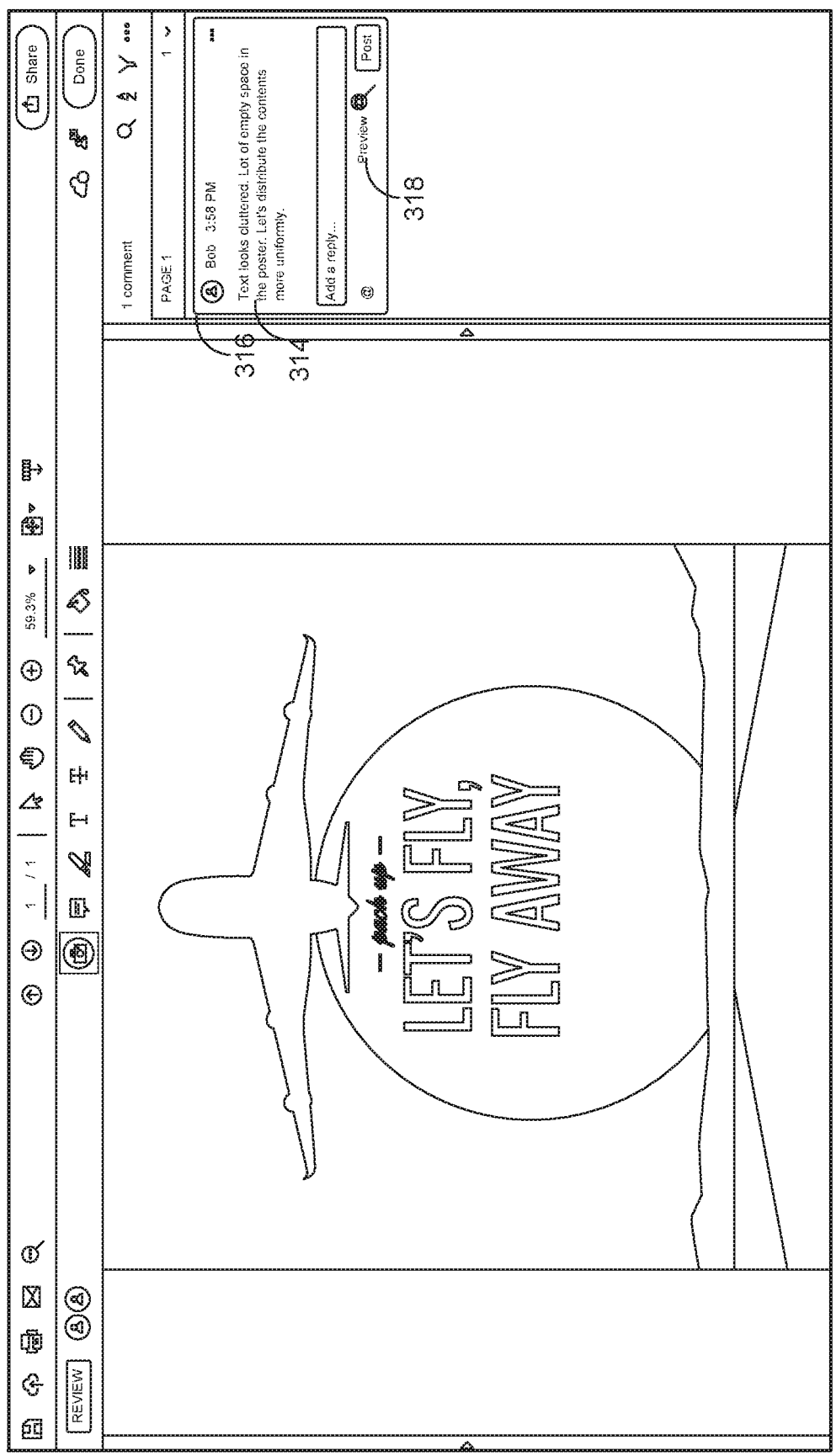
Figure 3E:
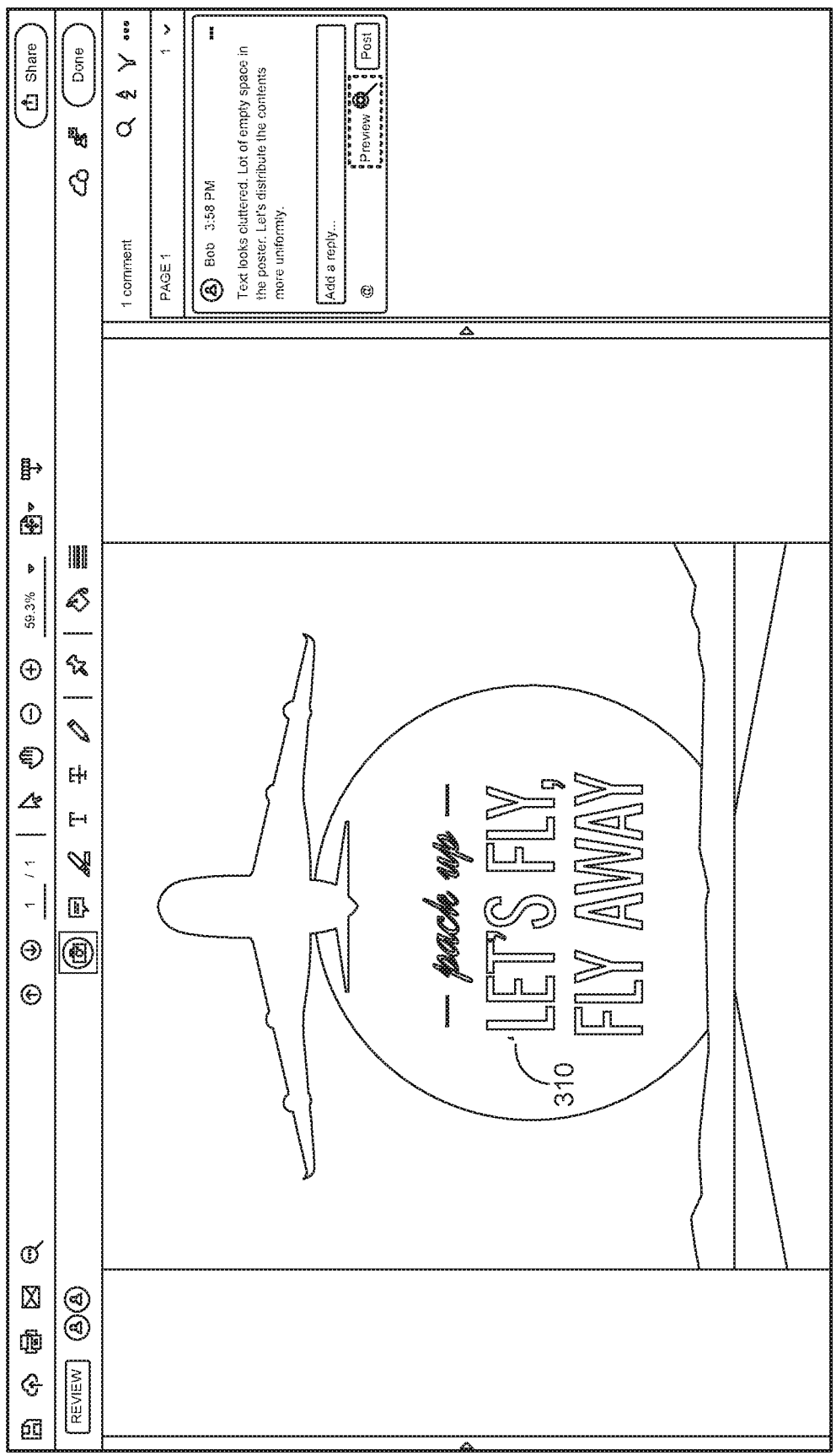

Turning now to FIG. 3D, assume that another document collaborator receives an email notification about the new feedback. In such a case, the collaborator can open the document and view the text-based comment 314 provided by the feedback provider. As shown in FIG. 3D, the comment box having the text-based comment 314 can also be presented along with an option to preview design changes or modifications via a preview button 318. Although the preview button 318 is provided within a comment box 316, as can be appreciated, such a preview button 318 can be presented in accordance with various aspects of the document. Assume the collaborator viewing the document desires to preview the design changes. In such a case, the collaborator can select the preview button 318. In response to selecting preview button 318, the design-based feedback provided in accordance with FIG. 3C can be applied to the document and presented to the collaborator, as shown in FIG. 3E. In particular, the design graphical element 310 is moved downward on the document with a particular placement to illustrate how the feedback provider envisioned distributing the contents. The collaborator reviewing the feedback now has a better understanding of the requested change indicated in the comment box.

Figure 4:
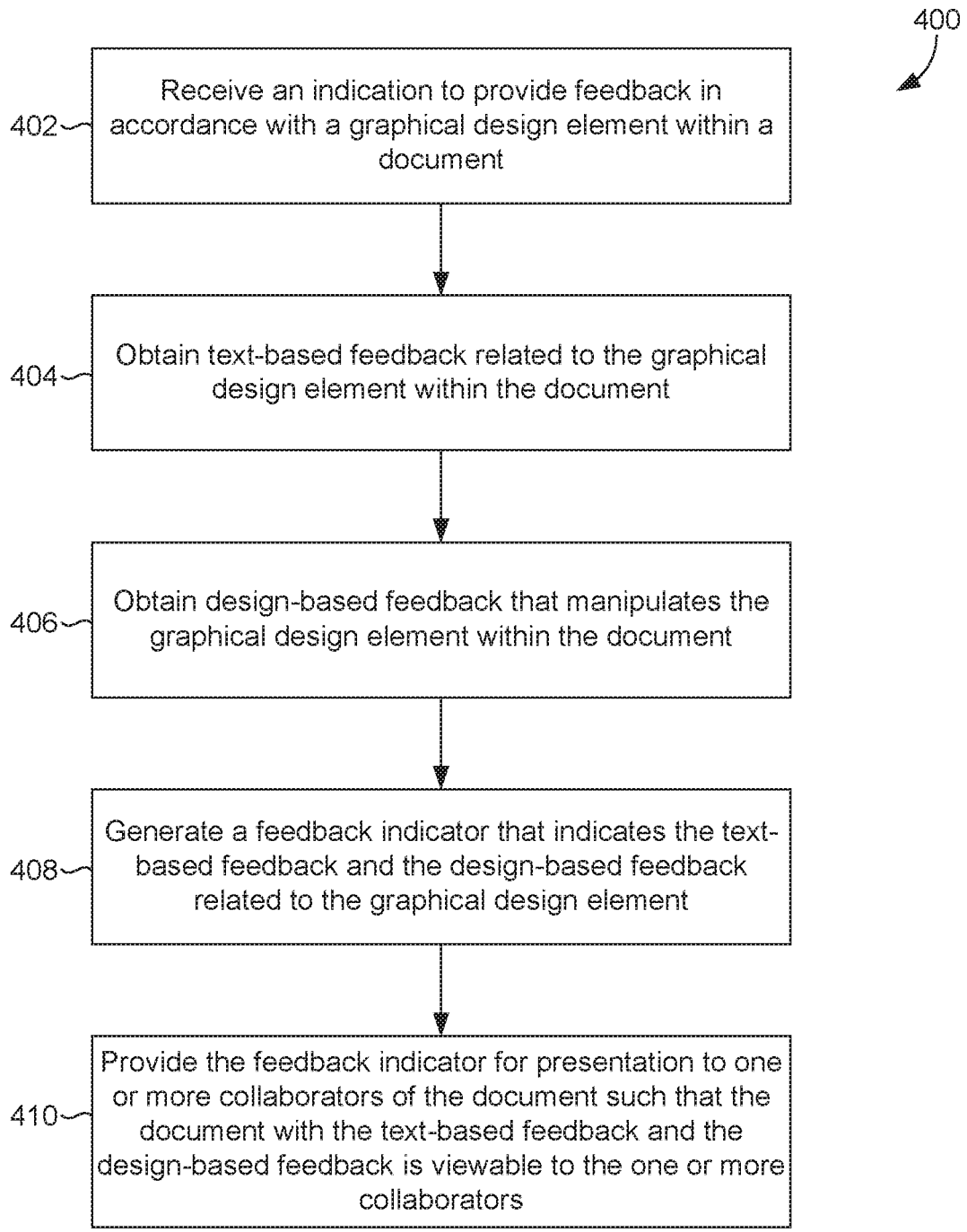
FIG. 4 provides one method for enhancing design collaboration using design-based feedback, in accordance with various embodiments of the present disclosure.
Figure 5:
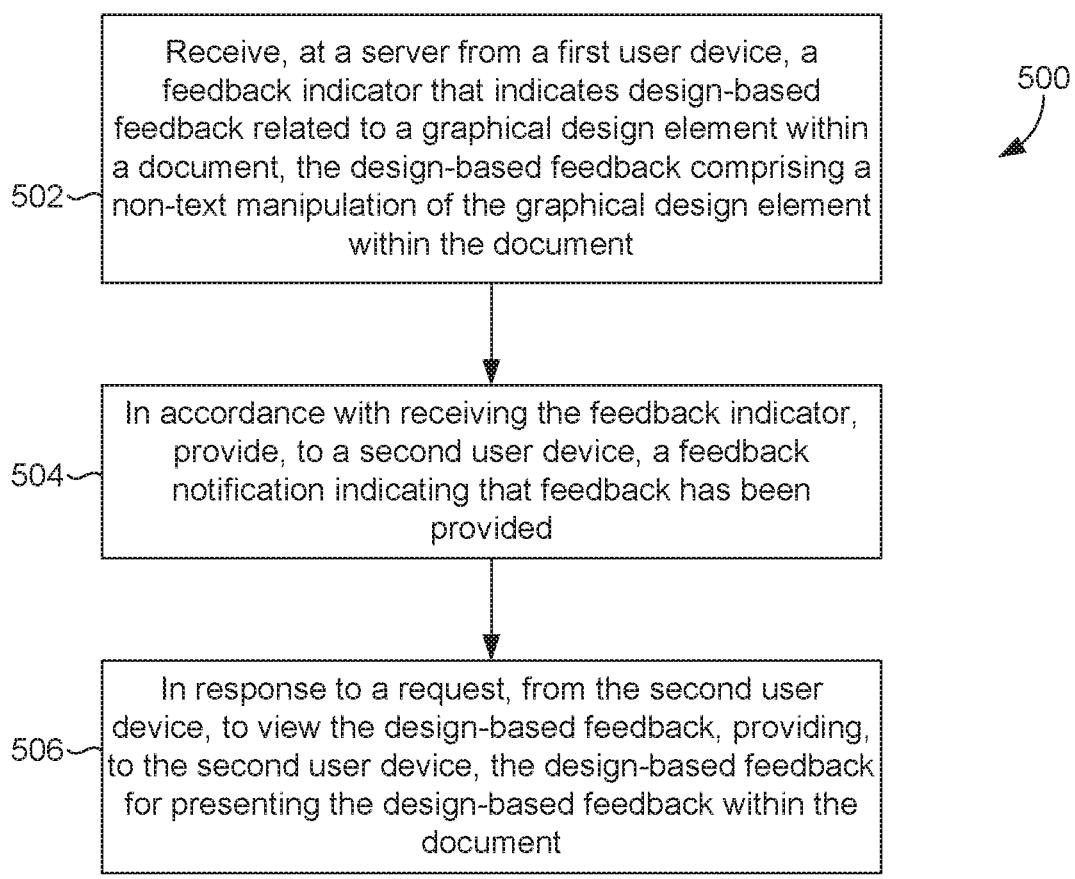
FIG. 5 provides another method for enhancing design collaboration using design-based feedback, in accordance with various embodiments of the present disclosure.
Figure 6:
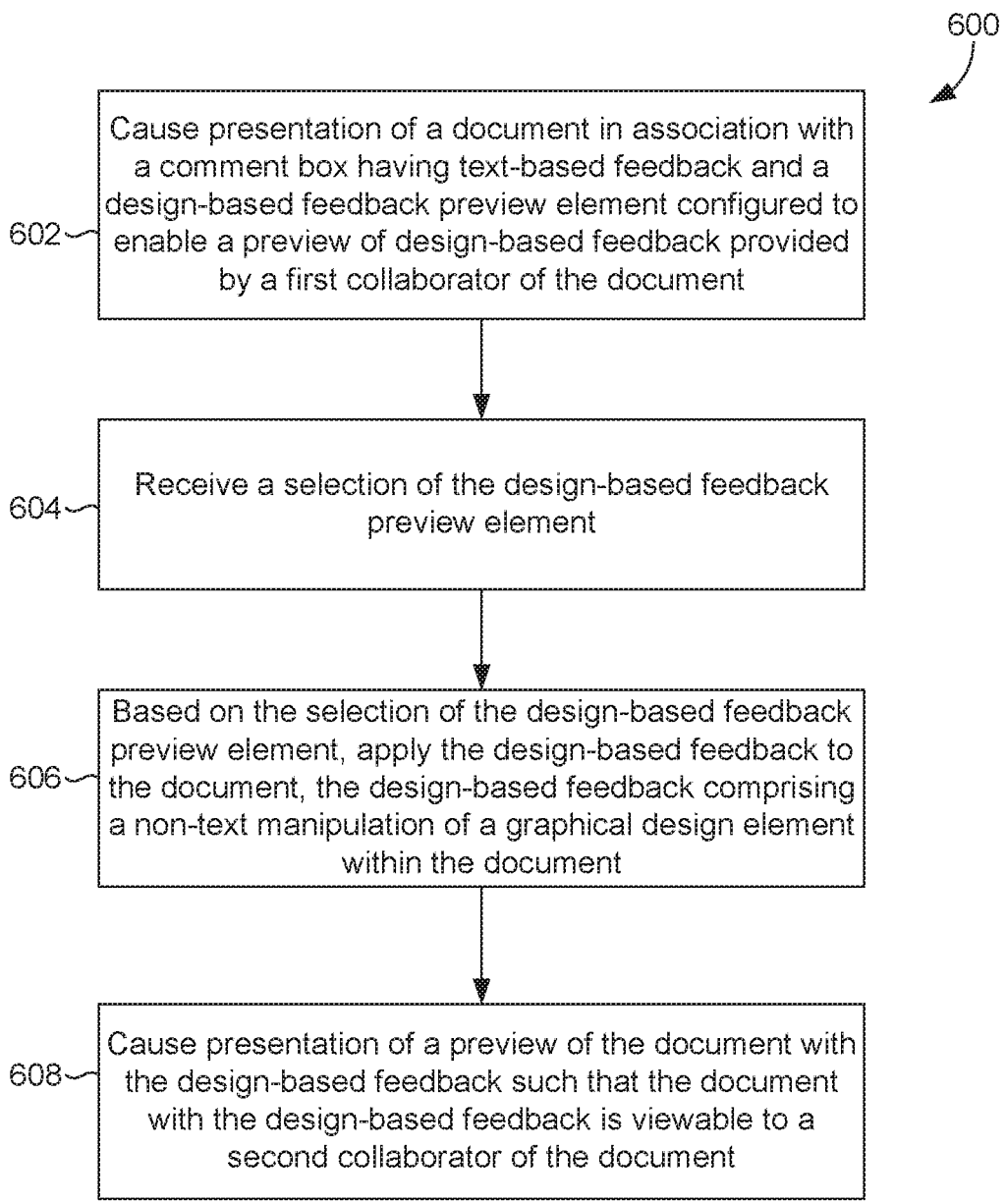
FIG. 6 provides another method for enhancing design collaboration using design-based feedback, in accordance with various embodiments of the present disclosure.

With reference to FIGS. 4-6, FIGS. 4-6 illustrate exemplary process flows in accordance with various embodiments described herein. Such process flows enable enhanced design collaboration using design-based feedback.

Turning initially to FIG. 4, FIG. 4 provides one method 400 for enhancing design collaboration using design-based feedback. Method 400 can be performed, for example, a user device, such as user device 102A of FIG. 1. At block 402, an indication to provide feedback in accordance with a graphical design element within a document. In this regard, a user, such as a feedback provider, may select to provide feedback (e.g., text-based feedback and/or design-based feedback) in relation to a particular graphical design element. At block 404, a text-based feedback related to the graphical design element within the document is obtained. For example, a comment box may be presented and a user may provide text comments in the comment box. At block 406, a design-based feedback that manipulates the graphical design element within the document is obtained. For instance, a user may modify a position, size, scale, style, etc. of the graphical design element within the document. At block 408, a feedback indicator (e.g., a set of metadata) is generated that indicates the text-based feedback and the design-based feedback related to the graphical design element. Such a feedback indicator may include an indication of the text-based feedback, the design-based feedback (e.g., via a content diff), the particular graphical design element, the user providing the feedback, or the like. A feedback indicator may be provided to another device (e.g., a server and/or user device) embedded in a document or independent of a document to which it corresponds. Thereafter, at block 410, the feedback indicator is provided for presentation to one or more collaborators of the document such that the document with the text-based feedback and the design-based feedback is viewable to the one or more collaborators. The feedback indicator can be provided to a server for facilitating distribution to user devices such that other collaborators can view the feedback.

Turning to FIG. 5, FIG. 5 illustrates another process flow showing a method 500 for enhancing design collaboration using design-based feedback. Method 500 can be performed, for example, by a server, such as server 108 of FIG. 1. Initially, at block 502, a feedback indicator is received from a first user device that indicates design-based feedback related to a graphical design element within a document. The design-based feedback can include a non-text manipulation of the graphical design element within the document. The feedback indicator can also include text-based feedback, an indication of the feedback provider, a time at which feedback is provided, etc. At block 504, in accordance with receiving the feedback indicator, a feedback notification is provided to a second user device indicating that feedback has been provided. Such a feedback notification may be provided via email, via the application, or the like. Thereafter, at block 506, in response to a request, from the second user device, to view the design-based feedback, the design-based feedback is provided to the second device for presenting the design-based feedback within the document. In this regard, a user of the second user device may request to view the design-based feedback. This can be performed in many ways, such as opening the document or selecting a preview button or icon associated with the design-based feedback. In some cases, the server may incorporate the design-based feedback into the document and then provide the modified document to the second user device. In other cases, the server may provide the document in association with the design-based feedback (e.g., via a content diff) such that the second user device can incorporate the design-based feedback into the document. In yet other cases, the server may provide the design-based feedback (e.g., via a content diff) separate from the document (e.g., via a server call).

With respect to FIG. 6, FIG. 6 illustrates another process flow showing a method 600 for enhancing design collaboration using design-based feedback. Method 600 can be performed, for example, by a user device, such as user device 102B of FIG. 1. Initially, at block 602, a document is presented in association with a comment box having text-based feedback and a design-based feedback preview element configured to enable a preview of design-based feedback provided by a first collaborator of the document. In some embodiments, upon opening the document or accessing the document, the document and the comment box may be automatically presented along with the design-based feedback preview element. At block 604, a selection of the design-based feedback preview element is received. For example, a user may select the design-based feedback preview element. At block 606, based on the selection of the design-based feedback preview element, the design-based feedback is applied to the document, the design-based feedback comprising a non-text manipulation of a graphical design element within the document. For instance, upon selecting the design-based feedback preview element, a content diff may be accessed (e.g., locally or via a server call) and utilized to modify the document to include the design-based feedback. At block 608, a preview of the document is presented with the design-based feedback such that the document with the design-based feedback is viewable to a second collaborator of the document.

Having described embodiments of the present invention, FIG. 7 provides an example of a computing device in which embodiments of the present invention may be employed. Computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 7 is merely illustrative of an exemplary computing device that can be used in connection with one or more embodiments of the present invention. Distinction is not made between such categories as "workstation," "server," "laptop," "handheld device," etc., as all are contemplated within the scope of FIG. 8 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. As depicted, memory 712 includes instructions 724. Instructions 724, when executed by processor(s) 714 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 700. Computing device 700 may be equipped with depth cameras, such as stereoscopic camera systems, infrared camera systems, RGB camera systems, and combinations of these, for gesture detection and recognition. Additionally, computing device 700 may be equipped with accelerometers or gyroscopes that enable detection of motion. The output of the accelerometers or gyroscopes may be provided to the display of computing device 700 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method comprising:
receiving an indication to provide feedback related to a graphical design element within a document;
obtaining a text-based feedback related to the graphical design element within the document;
obtaining a design-based feedback that manipulates the graphical design element within the document;
generating a feedback indicator that indicates the text-based feedback and the design-based feedback related to the graphical design element, wherein generating the feedback indicator comprises including, within the feedback indicator, indications of the text-based feedback and data of the design-based feedback that is useable to apply the design-based feedback to the document; and providing, via a network, the feedback indicator to enable presentation of the feedback to one or more collaborators of the document such that the document with the text-based feedback and the design-based feedback is viewable to the one or more collaborators.

2. The computer-implemented method of claim 1, wherein receiving the indication to provide feedback related to the graphical design element comprises receiving an indication of a selection of the graphical design element.

3. The computer-implemented method of claim 1, wherein receiving the indication to provide feedback related to the graphical design element comprises:

receiving an indication of a selection of a feedback element indicating a desire to provide feedback; and receiving an indication of a selection of the graphical design element.

4. The computer-implemented method of claim 1 further comprising:

in response to the indication to provide feedback related to the graphical design element, providing a comment box for receiving the text-based feedback entering an edit mode for receiving the design-based feedback and capturing graphical manipulations to the graphical design element while in the edit mode, wherein data of the graphical manipulations are included within the feedback indicator as part of the design-based feedback.

5. The computer-implemented method of claim 1, wherein the feedback indicator further comprises an indication of the graphical design element.

6. The computer-implemented method of claim 1, wherein the feedback indicator indicates the design-based feedback via a content diff that indicates differences in the document based on the manipulation of the graphical design element within the document, wherein the content diff includes data that is useable to apply the manipulation of the graphical design element to the document.

7. The computer-implemented method of claim 1, wherein the feedback indicator is provided based on receiving an indication to share the feedback.

8. The computer-implemented method of claim 1, wherein the design-based feedback comprises data corresponding to a manipulation of a style, a size, a position, a scale, a rotation, or a combination thereof related to the graphical design element.

9. One or more computer-readable media having a plurality of executable instructions embodied thereon, which, when executed by one or more processors, cause the one or more processors to perform a method, the method comprising:

receiving, at a server from a first user device, a feedback indicator that includes modification data of design-based feedback related to a graphical design element within a document, the design-based feedback comprising a non-text manipulation of the graphical design element within the document, wherein the feedback indicator is separate from the document;

in accordance with receiving the feedback indicator, providing, to a second user device, a feedback notification indicating that feedback has been provided; and in response to a request, from the second user device, to view the design-based feedback, providing, to the second user device, the modification data of the design-based feedback included within the feedback indicator to enable presenting the design-based feedback within the document.

10. The media of claim 9, wherein the feedback indicator further indicates text-based feedback related to the graphical design element.

11. The media of claim 9, wherein the feedback indicator indicates the design-based feedback via a content diff that indicates differences in the document based on the non-text manipulation of the graphical design element within the document, wherein the content diff includes data that is useable to apply the non-text manipulation of the graphical design element to the document.

12. The media of claim 9, wherein the request to view the design-based feedback is received from the second user device based on a user selection to view the document.

13. The media of claim 9, wherein the request to view the design-based feedback is received from the second user device based on a user selection to preview the design-based feedback.

14. A computing system comprising:

one or more processors; and one or more non-transitory computer-readable storage media, coupled with the one or more processors, having instructions stored thereon, which, when executed by the one or more processors, cause the computing system to:

causing presentation of a document having text-based feedback and a design-based feedback preview element configured to enable a preview of design-based feedback provided by a first collaborator of the document;

receiving a selection of the design-based feedback preview element;

based on the selection of the design-based feedback preview element, accessing a feedback indicator that is stored separately from the document, wherein the feedback indicator includes modification data of the design-based feedback;

applying the modification data of the design-based feedback to the document, the modification data of the design-based feedback comprising data that is useable to apply a non-text manipulation of a graphical design element to the document; and causing presentation of a preview of the document with the design-based feedback such that the document with the design-based feedback is viewable to a second collaborator of the document.

15. The system of claim 14, wherein the presentation of the document is caused in response to the second collaborator of the document selecting to view the document.

16. The system of claim 14, wherein the text-based feedback and the design-based feedback are provided by the first collaborator in association with the graphical design element within the document.

17. The system of claim 14, wherein the design-based feedback is applied to the document via a content diff that indicates differences in the document based on the non-text manipulation of the graphical design element within the document, wherein the content diff includes data that is useable to apply the non-text manipulation of the graphical design element to the document.

18. The system of claim 14 further comprising:

receiving a selection to incorporate the design-based feedback into the document; and incorporating the design-based feedback into the document.

19. The system of claim 14, wherein the design-based feedback preview element comprises an icon presented within a comment box having the text-based feedback.

20. The system of claim 14, wherein the graphical design element comprises a non-text element.

* * * * *